United States Patent [19]

Georgis et al.

[11] Patent Number: 4,845,577
[45] Date of Patent: Jul. 4, 1989

[54] APPARATUS AND METHOD FOR ENABLING RAPID SEARCHING OF HELICALLY RECORDED MAGNETIC TAPE

[75] Inventors: Steven P. Georgis; Juan A. Rodriguez, both of Boulder; E. Christopher Pisciotta, Louisville, all of Colo.

[73] Assignee: Exabyte Corporation, Boulder, Colo.

[21] Appl. No.: 48,385

[22] Filed: May 11, 1987

[51] Int. Cl.4 .................. G11B 15/18; G11B 15/46; G11B 15/48
[52] U.S. Cl. .................. 360/72.2; 360/73.03; 360/74.4
[58] Field of Search .................. 360/72.2, 72.1, 73, 360/74.4, 74.1, 27, 18

[56] References Cited

U.S. PATENT DOCUMENTS

| 3,821,710 | 6/1974 | Arciprete et al. | 360/72.2 |
| 4,175,267 | 11/1979 | Tachi | 360/72.2 |
| 4,293,879 | 10/1981 | Heitmann et al. | 360/72.2 |
| 4,628,372 | 12/1986 | Morisawa | 360/72.2 |

FOREIGN PATENT DOCUMENTS

| 2906836 | 9/1980 | Fed. Rep. of Germany | 360/74.4 |
| 55-67959 | 5/1980 | Japan | 360/74.4 |
| 56-93157 | 7/1981 | Japan | 360/27 |
| 57-55579 | 4/1982 | Japan | 360/18 |
| 58-133665 | 8/1983 | Japan | 360/72.1 |
| 59-139157 | 8/1984 | Japan | 360/72.2 |

Primary Examiner—John H. Wolff
Assistant Examiner—Matthew J. Bussan
Attorney, Agent, or Firm—Griffin, Branigan & Butler

[57] ABSTRACT

Apparatus and method are disclosed for enabling rapid search of magnetic tape having information helically recorded thereon. A tape mark, consisting of an analog signal, is recorded on the magnetic tape as a physical location reference in a manner such that the mark can be detected at both normal playback speed and at faster search speeds. The recorded analog signal provides a highly reliable indication of record boundaries, including end of file, end of volume, end of directory, and the like.

16 Claims, 4 Drawing Sheets

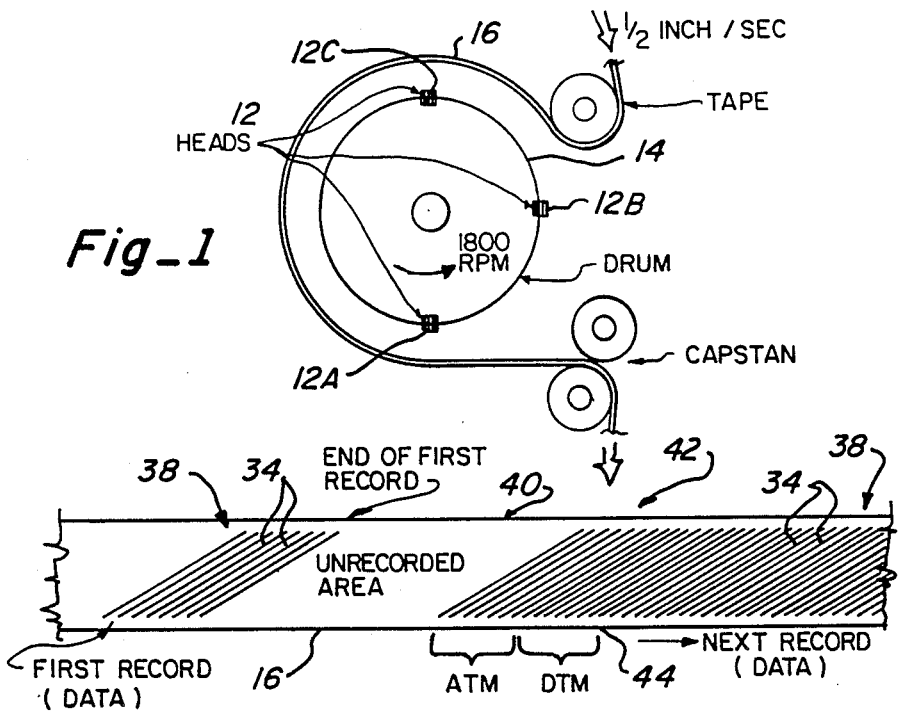
Fig_1
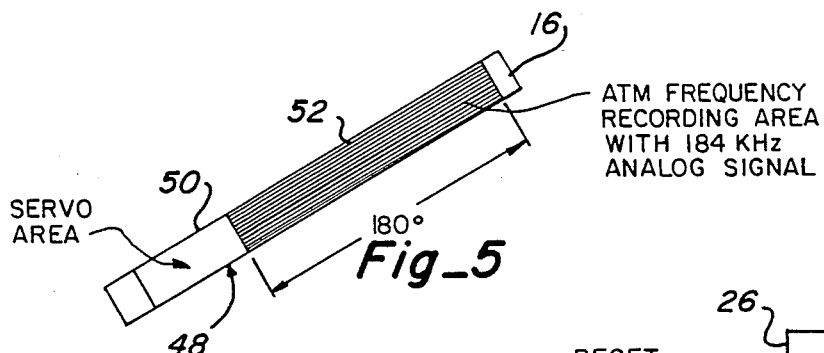
Fig_4
Fig_5
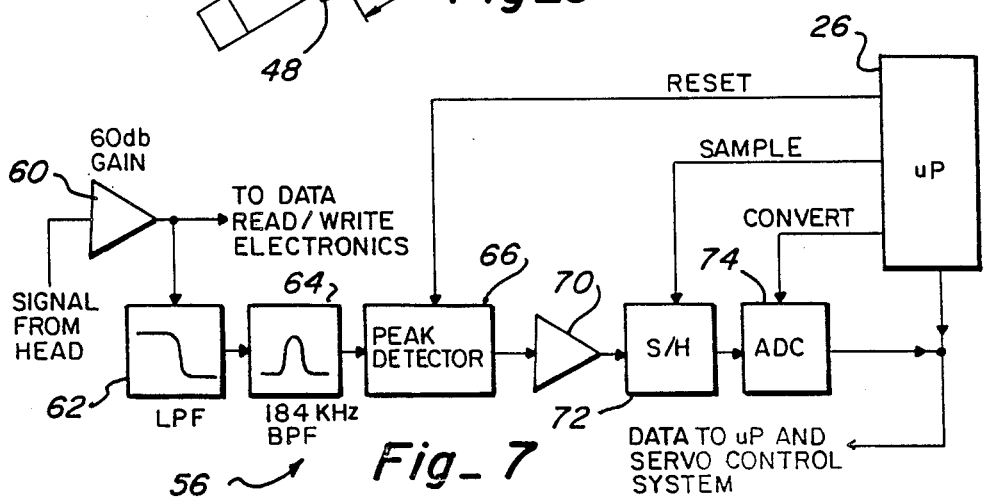
Fig_7

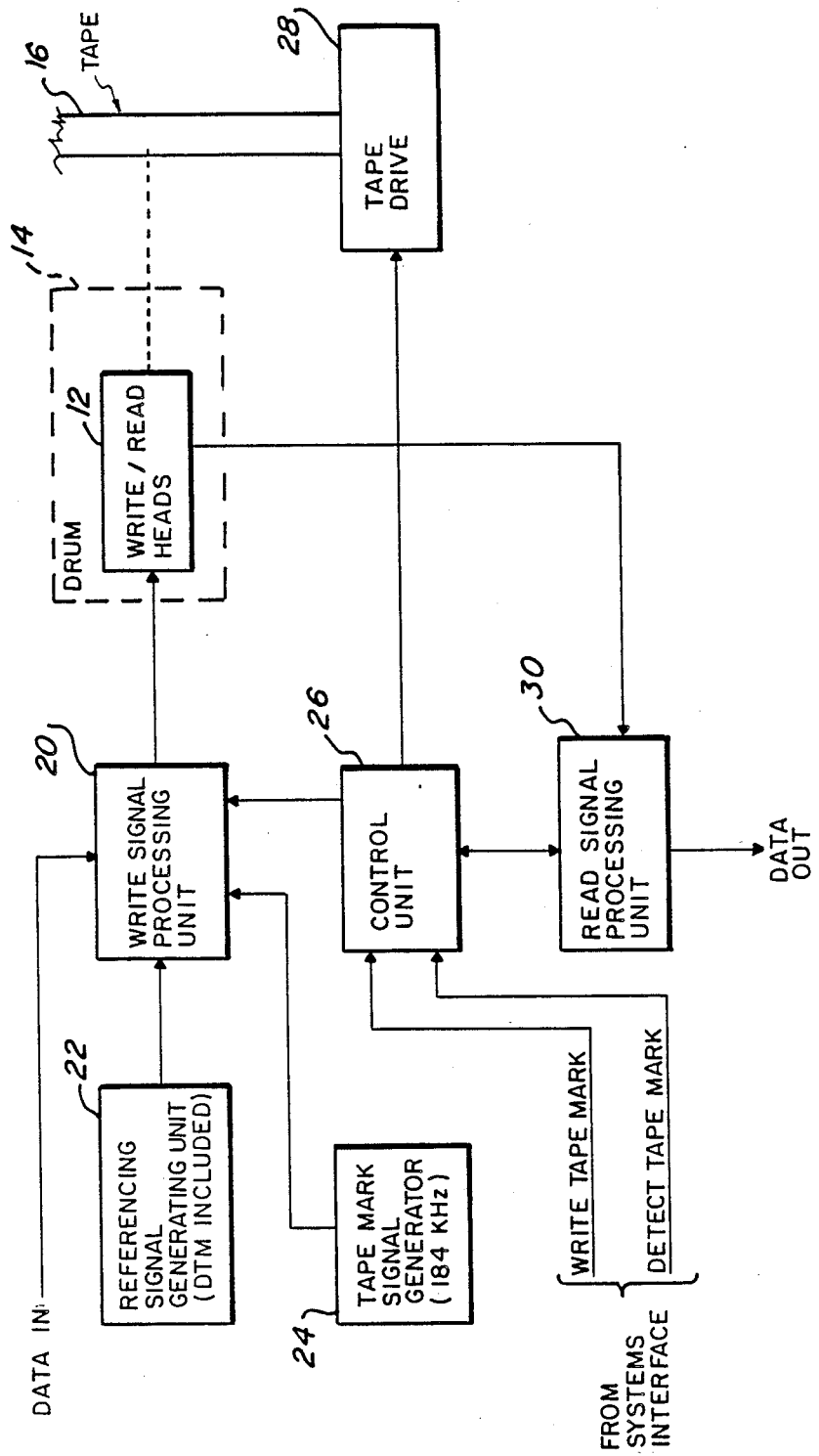
Fig_2

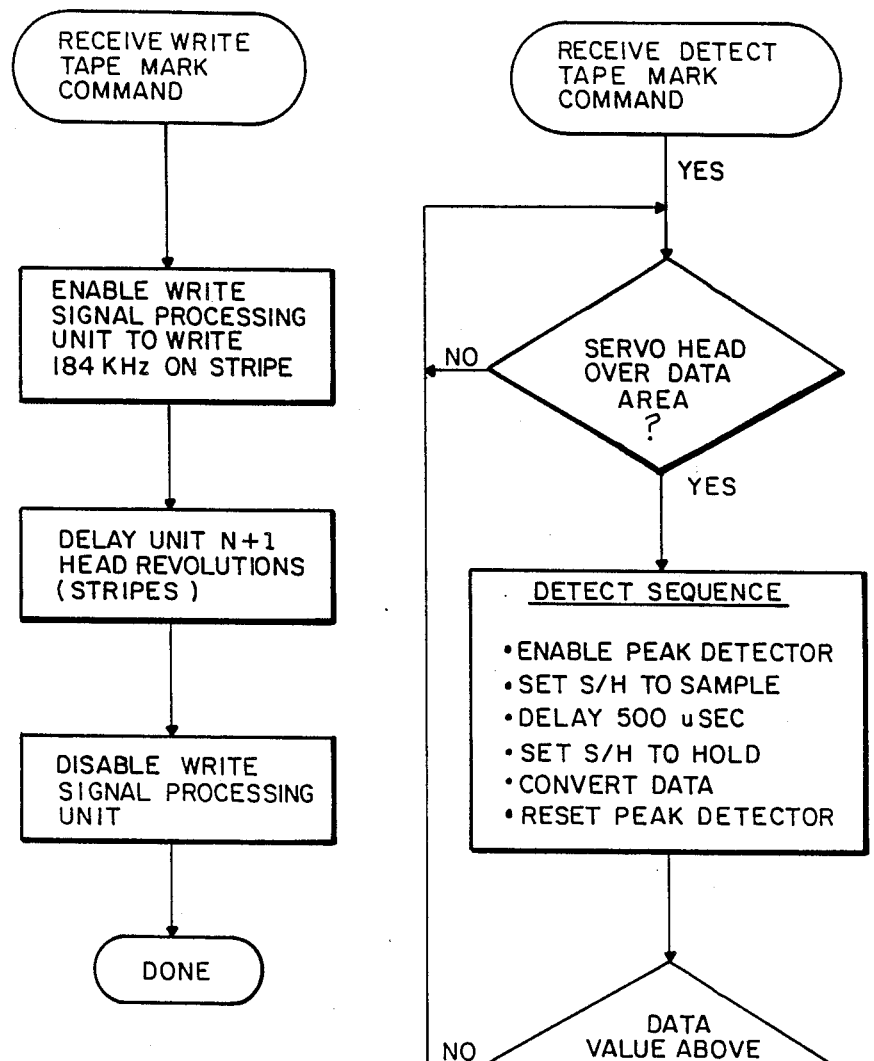
Fig_3
Fig_8

Fig_6A 
Fig_6B 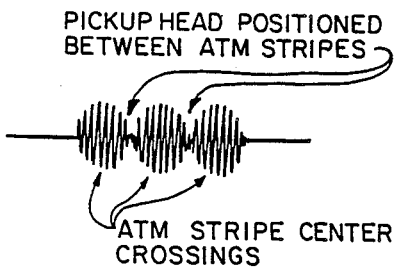
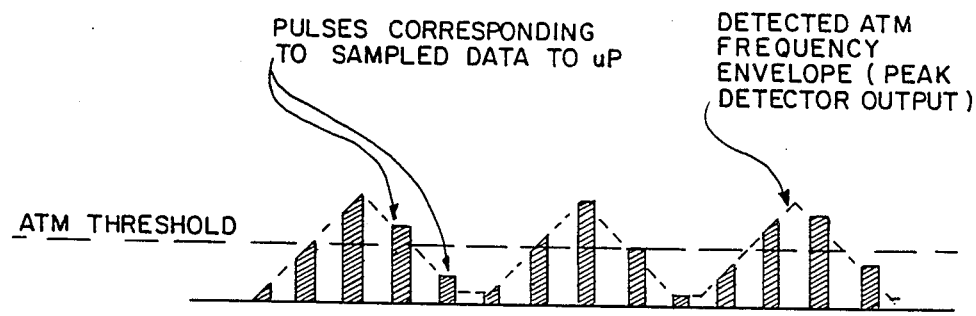
Fig_9

APPARATUS AND METHOD FOR ENABLING RAPID SEARCHING OF HELICALLY RECORDED MAGNETIC TAPE

FIELD OF THE INVENTION

This invention relates to location searching of magnetic tape, and, more particularly, relates to location searching of helically recorded magnetic tape by tape mark insertion.

BACKGROUND OF THE INVENTION

Magnetic tape is now widely used for various recording purposes, and at least some such uses have necessitated development of systems and methods whereby information stored on the tape can be located and recovered. This is particularly important where computer-generated information, for example, is to be stored on the tape.

To aid in recovery of information on the tape, various techniques have been heretofore devised, and some search techniques have required the use of elaborate external devices, as well as using some type of identification marking on the tape. Techniques now known, however, have not proved to be completely satisfactory in achieving rapid and reliable searching for information on the tape, and this has been particularly true when a helical scan arrangement has been utilized for recording data on the tape.

Known techniques have, for example, failed to provide a system or method capable of accurately and reliably determining information locations on the tape and/or have failed to provide a system or method capable of searching at speeds faster than normal playback. Searching at normal playback speeds is obviously disadvantageous since the time required to find a particular record is of the same order as that required for reading the entire tape until the record is found.

SUMMARY OF THE INVENTION

This invention provides a system and method for reliably and accurately locating physical locations on magnetic tape having helically recorded information thereon, and for enabling searching of the tape at speeds higher than normal playback speeds. A tape mark, consisting of an analog signal, is recorded, by helical scan recording, on the magnetic tape as a physical location reference, with the mark being recorded in a manner such that the mark can be detected at both normal playback speed and at higher search speeds.

It is therefore an object of this invention to provide an improved system and method for location searching of magnetic tape having helically recorded information thereon.

It is still another object of this invention to provide an improved system and method for enabling rapid searching of magnetic tape, having helically recorded information thereon, that is both accurate and reliable.

It is still another object of this invention to provide an improved system and method for location searching of magnetic tape, having helically recorded information thereon, utilizing an analog signal recorded on the tape as a tape mark.

It is still another object of this invention to provide an improved system and method for location searching of magnetic tape, having helically recorded information thereon, wherein searching can be accomplished at normal playback speed and also at higher speeds.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a schematic illustration of a helical scanning arrangement for use in magnetic tape recording;

FIG. 2 is a block diagram illustrating the invention;

FIG. 3 is a flow diagram indicating operation of the control unit in FIG. 2 after receipt of a tape mark WRITE command;

FIG. 4 is an illustration of a section of magnetic tape having data recorded thereon by a helical scan arrangement, as shown in FIG. 1, and having incorporated thereon a tape mark as used in this invention;

FIG. 5 is an illustration of one stripe of the plurality of stripes indicated in FIG. 4 as having the tape mark thereon, and shows the tape mark according to this invention recorded thereon;

FIG. 6A is a typical waveform illustrating detection of the tape mark, recorded as illustrated in FIGS. 4 and 5, with the playback device operating at normal playback speed;

FIG. 6B is a typical waveform showing detection of the tape mark recorded as illustrated in FIGS. 4 and 5, with the playback device operating at a search speed higher than normal playback speed;

FIG. 7 is a block diagram of the detector unit used for detection of recorded tape marks according to this invention;

FIG. 8 is a flow diagram indicating operation of the control unit in FIG. 2 after receipt of a tape mark DETECT command; and FIG. 9 is a typical waveform illustrating the output from the detector shown in FIG. 7, and indicating detected tape marks above a predetermined threshold.

DESCRIPTION OF THE INVENTION

For helical scan recording, a plurality of heads 12 (designated as heads 12A, 12B, and 12C) are physically located on rotatable drum 14 having tape 16 partially wrapped around the drum, as illustrated in FIG. 1.

As indicated in FIG. 2, heads 12 are connected with WRITE signal processing unit 20 which receives data, such as computer-generated data signals, and adds thereto various referencing signals from referencing signal generating unit 22. A digital tape mark (DTM) is included in these referencing signals to provide detailed physical location information.

In accordance with this invention, tape mark signal generator 24 is also connected with WRITE signal processing unit 20 and provides a 184 KHz sinusoidal signal output to processing unit 20. Processing unit 20 is controlled by control unit 26, preferably a microprocessor which is responsive to WRITE signals from the systems interface, and control unit 26 also controls tape drive 28 which controls the speed of tape 16. A flow chart showing the sequence of events provided for by control unit 26 during the tape mark WRITE mode is provided in FIG. 3.

As also indicated in FIG. 2, the sensed output from a head 12 is coupled to READ signal processing unit 30 which provides a data output and also provides an input to control unit 26 to control the speed of tape 16. Control unit 26 controls READ signal processing unit 30 in response to DETECT signals from the systems interface.

As is well known, when drum 14 is oriented at an angle with respect to the direction of travel of the tape and rotated at a high speed relative to the speed of the tape, recording of information on the tape is by stripes 34, as indicated in FIG. 4. As indicated in FIG. 1, the preferred speed of the drum is 1800 rpm with a tape speed of one-half inch per second for normal recording and playback. The invention, however, is not meant to be restricted to the relative speeds which have been set forth by way of example.

Heads 12A, 12B, and 12C are used to record and detect various information. In the preferred embodiment of this invention, head 12A is used to record an analog tape mark, while servo head 12B is used to detect the tape mark during searching operations. It is to be realized, however, that other heads could be utilized, if desired, and that one or more of the heads are commonly utilized for recording reference information and data on the tape which is utilized during playback, and is well known to one skilled in the art.

The analog tape mark, when recorded, provides encoding of special location references on helically-recorded tape 16, such that the location references can be detected at both normal playback speed and at faster searching speeds. In this invention, the analog tape mark provides a highly reliable method of recording special tape marks for the purpose of indicating record boundaries, such as end of file, end of volume, end of directory, etc. Such physical location references are necessary in order to enable searching a tape for a particular record.

FIG. 4 illustrates the relationship between helically-recorded referencing information and data on the tape and the analog tape mark (ATM) utilized in this invention. As shown in FIG. 4, the boundary of data record area 38 is preferably followed by an unrecorded area 40 and analog tape mark area 42 follows the unrecorded area. Digital tape mark (DTM) area 44 occurs normally at the start of the next data record area 38. The digital tape mark is normally recorded as a part of the referencing information, is recorded after the analog tape mark, and provides detailed physical location information when read back at normal tape speed. The digital tape mark, however, cannot be detected at a higher search speed.

The analog tape mark and the digital tape mark thus work together to provide a reliable searching system, with the analog tape mark allowing high speed searching which is followed by verification of the physical reference using the digital tape mark. A typical high speed search first uses the analog tape mark to locate the desired position on the tape, and this is followed by reading the digital tape mark at normal playback speed to verify the physical location indicated by the analog tape mark.

FIG. 5 illustrates one stripe 48 of the plurality of stripes within the analog tape mark area 42 as indicated in FIG. 4. As shown, stripe 48 includes servo area 50 and analog tape mark recording area 52 which covers a major portion of the stripe. The servo area is used by the tape drive servo feedback tracking electronics, while analog tape mark area 52 corresponds to 180° of head rotation with respect to the tape stripe, and has the analog signal recorded thereon. The analog signal is preferably a pure sinusoidal signal having a frequency of 184 KHz.

Because the analog tape mark is recorded at the normal stripe recording speed, servo pickup head 12B traverses the analog tape mark stripes at an angle during high speed searching, and therefore all of any particular analog tape mark stripe is not detected. Because of the physical relationship of the analog tape mark and servo head during a high speed search, care must be taken to assure that a single stripe containing the analog tape mark frequency is detected.

If the ratio of search speed to normal playback/record speed is N, then the minimum number of analog tape mark stripes required for detection of at least one analog tape mark stripe at search speed is N/2+1. In the preferred embodiment of this invention, N+1 stripes are recorded to provide reliable analog tape mark detection. Thus, a total of six analog tape mark stripes are required for a search speed five times that of the normal record/playback speed.

At normal tape speed, the detected analog tape mark has a waveform as typically shown in FIG. 6A. The envelope of the analog tape mark frequency is constant, since the servo head tracks the entire length, or 180° of head rotation, of each analog tape mark stripe.

FIG. 6B illustrates a typical detected analog tape mark signal waveform at a search speed higher than the normal record/playback speed. Here, the envelope of the analog tape mark frequency is amplitude modulated as the servo head crosses multiple analog tape mark stripes.

In the search mode, the signal, such as illustrated in FIG. 6B, is coupled to analog tape mark detector 56 (of READ signal processing unit 30) shown in FIG. 7. In the preferred embodiment of this invention, analog tape mark detector 56 includes a gain stage 60 (60 db gain), after which the analog tape mark signal is filtered by low-pass filter 62 and bandpass filter 64 to isolate the 184 KHz analog tape mark frequency and reduce the amplitude of noise with frequency components outside of the pass band. The filtered output is then coupled to analog peak detector 66 which produces an approximation of the envelope of the analog tape mark signal. Peak detector 66 is reset by microprocessor 26.

After amplification by amplifier 70, the analog tape mark envelope is coupled to sample and hold (S/H) circuit 72 which samples the analog tape mark envelope at discrete times upon being issued a SAMPLE command from microprocessor 26. The sampled analog tape mark envelope is coupled to analog-to-digital converter (ADC) 74. Microprocessor 26 then issues a CONVERT command whereupon the analog-to-digital converter quantizes the sampled analog tape mark envelope and outputs a binary data representation, which is received by microprocessor 26. A flow chart showing the sequence of events provided for by microprocessor 26 during the tape mark search mode is provided in FIG. 8.

A typical reconstructed analog waveform corresponding to the data representation of the sampled, quantized analog tape mark envelope is shown in FIG. 9. As the envelope has been sampled at discrete times, the waveform appears as a series of pulses with amplitudes equal to the magnitude of the envelope of the analog tape mark signal at these times.

Microprocessor 26 compares this analog tape mark detector data with a predetermined analog tape mark threshold. An analog tape mark occurrence is indicated if a sufficient number of pulses exceeding the analog tape mark threshold are detected within a given time period by the microprocessor.

A detected analog tape mark occurrence typically causes the tape drive system to stop and revert to the normal playback speed, after which the digital tape mark is read to provide detailed physical location preferences. The detailed location references can then be used to verify the physical tape location against the desired location.

As indicated in FIG. 4, the preferred embodiment includes an unrecorded area between the data area and the analog tape mark. The purpose of this unrecorded (i.e., blank) area is to allow a lead-in area ahead of the analog and digital tape mark so that data can be appended to the first data area while allowing erasure of the analog and digital tape mark. The analog and digital tape mark must be erased if the appended data is to be recorded as a record, uninterrupted by tape mark stripes.

A typical append operation to the first data area would require first locating the end of the data area and then positioning the record head 12A at the correct location to begin appending data to the end of the record. Also, the tape must be located with respect to the heads such that the analog and digital tape mark can be erased in preparation of data recording. In the preferred embodiment, a fixed position full-width erase head is used (as opposed, for example, two relatively narrow heads normally used for reading/writing and servo pickup). The distance between the rotating heads and the erase head is about three inches. Thus, three linear inches of unrecorded tape area is left between the last recorded data in the record and the analog tape mark, in order to position the erase head ahead of the analog tape mark for erasure purposes.

As can be appreciated from the foregoing, this invention provides an improved system and method for enabling rapid searching of helically recorded magnetic tape utilizing an analog tape mark.

What is claimed is:

1. An apparatus for enabling high speed location searching of magnetic tape having data recorded thereon, said apparatus comprising:

signal generating means for generating recording output signals, said signal generating means further comprising:

means for generating an analog signal having a preselected frequency; and, means for generating signals indicative of physical location information;

recording and pickup means for recording said recording output signals from said signal generating means on said magnetic tape, and for detecting said recorded output signals on said magnetic tape to thereby provide pickup output signals indicative thereof;

drive means for transporting said magnetic tape relative to said recording and pickup means whereby said recording output signals are recorded as helical stripes on said magnetic tape, and whereby said pickup output signals are read as helical stripes from said magnetic tape;

control means for causing recording of said recording output signals at predetermined boundary locations on said magnetic tape at a predetermined normal recording speed, wherein during said recording said control means causes said recording and pickup means to record at said boundary locations a number of helical stripes, with the stripes of said number including the analog signal produced by said analog signal generating means, and to record at least one helical stripe utilizing the signals indicative of physical location information produced by said physical location information signal generating means, and for causing searching of said magnetic tape at a search speed greater than that of said normal recording speed, and wherein the number of helical stripes including the analog signal produced by said analog signal generating means is related to the ratio of said search speed to said normal recording speed; and, signal processing means for receiving said pickup output signals from said recording and pickup means indicative of said recorded output signal detected on said tape, and processing the same to provide discernable indications of said predetermined boundary locations.

2. The apparatus of claim 1 wherein said signal generating means includes means for generating a sinusoidal signal at said preselected frequency.

3. The apparatus of claim 2 wherein said signal generated by said signal generating means is at a frequency of about 184 KHz.

4. The apparatus of claim 1 wherein said number of stripes having said analog signal recorded thereon is not less than $N/2+1$, where N is equal to the ratio of said search speed to said normal recording speed.

5. The apparatus of claim 4 wherein said number of stripes having said analog signal recorded thereon is $N+1$.

6. The apparatus of claim 1 wherein said control means includes a microprocessor for receiving said output from said signal processing means for providing said indications of said predetermined boundary locations.

7. The apparatus of claim 1 wherein said signal processing means includes detector means.

8. The apparatus of claim 7 wherein said detector means includes filter means connected to said recording and pickup means, peak detector means connected to an output terminal of said filter means, sample and hold means connected to an output terminal of said peak detector means, and analog-to-digital converter means connected to an output terminal of said sample and hold means.

9. The apparatus of claim 1 wherein said signal processing means is connected with said control means to cause operation at said predetermined normal recording speed in response to said signal processing means providing each of said discernable indications of said predetermined boundary locations.

10. In an apparatus for enabling high speed location searching of magnetic tape having data recorded thereon, a tape mark system, comprising:

signal generating means for generating output signals, said signal generating means further comprising:

means for generating an analog signal having a preselected frequency; and, means for generating signals indicative of physical location information;

recording means for recording said output signal from said signal generating means on said magnetic tape;

drive means for transporting said magnetic tape relative to said recording and pickup means whereby said recording output signals are recorded as helical stripes on said magnetic tape, said drive means being suitable for transporting said magnetic tape at a predetermined normal recording speed and at a search speed greater than said normal recording speed;

mark establishing means for causing recording of said output signals at predetermined boundary locations on said magnetic tape at a predetermined normal recording speed, wherein during recording said mark establishing means causes said recording and pickup means to record at said boundary locations a number of helical stripes, with the stripes of said number including the analog signal produced by said analog signal generating means, and to record at least one helical stripe utilizing the signals indicative of 11. The system of claim 10 wherein said signal generating means includes means for generating a sinusoidal signal at a frequency of about 184 KHz.

12. The apparatus of claim 11 wherein said number of stripes having said analog signal recorded thereto is not less than N/2+1, where N is equal to the ratio of said search speed to said normal recording speed.

13. The apparatus of claim 12 wherein said number of stripes having said analog signal recorded thereon is N+1.

14. A process for enabling high speed location searching of magnetic tape having data recorded thereon, said process comprising:

generating an analog signal having a preselected frequency and signals indicative of physical location information;

recording said generated signals on said magnetic tape at boundary locations at a predetermined normal recording speed by recording a number of helical stripes, with the stripes of said number including the analog signal and thereafter to record at least one helical stripe utilizing the signals indicative of physical location information;

searching said magnetic tape at a higher search speed than said predetermined normal recording speed to detect said signal recorded on said tape;

utlizing said detected signal to determine predetermined boundary locations on said tape; and, wherein the number of helical stripes record which include the analog signal is related to the ratio of said search speed to said normal recording speed.

15. The process of claim 14 wherein said process includes reducing said search speed to the speed at which said generated signal was recorded on said tape when a predetermined location is detected during said higher speed searching.

16. The process of claim 14 wherein said method includes selecting the number of said stripes to have said analog signal recorded thereon so that the number of stripes so selected is not less than N/2+1, where N is equal to the ratio of said search speed to said normal recording speed.

* * * * *